(12) United States Patent
Deshpande et al.

(10) Patent No.: US 9,628,298 B2
(45) Date of Patent: Apr. 18, 2017

(54) ROUTING TECHNIQUE

(71) Applicant: Avaya Inc., Basking Ridge, NJ (US)

(72) Inventors: Bansidhar A. Deshpande, Pune (IN); Srinivasan Narayanan, Pune (IN)

(73) Assignee: Avaya Inc., Basking Ridge, NJ (US)

( * ) Notice: Subject to any disclaimer, the term of this patent is extended or adjusted under 35 U.S.C. 154(b) by 503 days.

(21) Appl. No.: 13/892,853

(22) Filed: May 13, 2013

(65) Prior Publication Data

US 2014/0334479 A1  Nov. 13, 2014

(51) Int. Cl.
*H04L 12/66*   (2006.01)
*H04L 12/64*   (2006.01)

(52) U.S. Cl.
CPC ................... *H04L 12/64* (2013.01)

(58) Field of Classification Search
CPC ................. H04L 12/66; H04L 45/74
USPC ......................................... 370/352
See application file for complete search history.

(56) References Cited

U.S. PATENT DOCUMENTS

| | | | | |
|---|---|---|---|---|
| 5,353,340 A * | 10/1994 | Kunz | ..................... | H04W 8/26 455/432.1 |
| 7,181,535 B1 * | 2/2007 | Remael | .................. | H04L 29/06 709/242 |
| 8,457,294 B1 * | 6/2013 | Glandon | ................. | H04L 12/66 370/352 |
| 2004/0198322 A1 * | 10/2004 | Mercer | ................... | H04L 51/38 455/412.1 |
| 2007/0223701 A1 * | 9/2007 | Emeott | ................ | H04L 63/104 380/270 |
| 2010/0074247 A1 * | 3/2010 | Clark | .................... | H04M 3/465 370/352 |

FOREIGN PATENT DOCUMENTS

| | | | | |
|---|---|---|---|---|
| EP | 0474812 | | 9/1995 | |
| WO | WO 0018090 | * | 3/2000 | ............. H04M 3/42 |

* cited by examiner

*Primary Examiner* — Wei Zhao
*Assistant Examiner* — Abdeltif Ajid
(74) *Attorney, Agent, or Firm* — Sheridan Ross P.C.

(57) ABSTRACT

A first communication device sends a call request to a second communication device. The call request comprises a source address associated with the first device and a destination address associated with the second communication device. A communication system modifies the call request by replacing or augmenting the source address with a dynamic address and adding a key associated with the source address. The modified request is sent to the second device.
If a user at the second device wants to make a return call, a call request is sent using the dynamic address as the destination address along with the key. The call request is routed to the first communication address by determining the source address of the first communication device from the key.

20 Claims, 6 Drawing Sheets

ROUTING TECHNIQUE

TECHNICAL FIELD

The systems and methods that relate to call routing and in particular call routing features.

BACKGROUND

Many companies today have large and complex enterprise networks that have locations throughout the world. When a user makes a call to another enterprise user at a long distance location, the call is routed using the enterprise network. If the call stays within the enterprise network, there is no long distance charge incurred. However, if the called user is not part of the enterprise network (e.g., a public user in a different country), the call may be routed to the Public Switched Telephone Network (PSTN) and a long distance toll or local toll may be incurred. Likewise, when the called party returns the call, a toll will also be incurred because the call will use the PSTN for routing the long distance call. What is needed is a solution that overcomes this problem.

SUMMARY

Systems and methods are provided to solve these and other problems and disadvantages of the prior art. A first communication device sends a call request to a second communication device. The call request comprises a source address associated with the first communication device and a destination address associated with the second communication device. A communication system modifies the call request by replacing or augmenting the source address with a dynamic address and adding a key associated with the source address. The modified request is sent to the second device. Procedure of changing the address can be based on a user or system configuration. For example, decision on when to apply the modification can be based on whether the call will incur a toll or whether a user wants to obfuscate the source address.

If a user at the second device wants to make a return call, a call request is sent using the dynamic address as the destination address along with the key. The call request is routed to the first communication address by determining the source address of the first communication device from the key.

DETAILED DESCRIPTION

Figure 1:
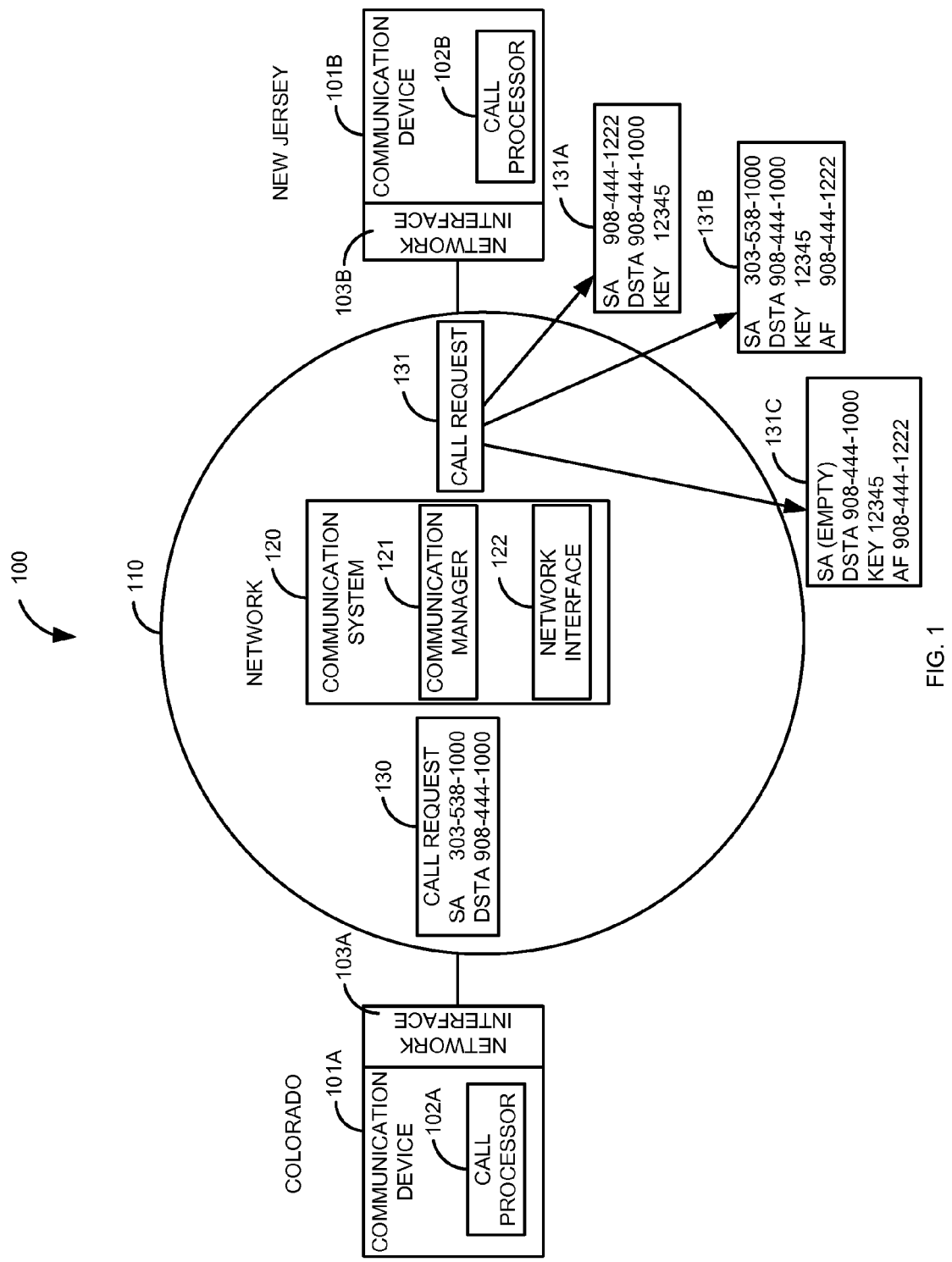
FIG. 1 is a block diagram of a first illustrative system for routing call requests.

FIG. 1 is a block diagram of a first illustrative system 100 for routing call requests (130/131). The first illustrative system comprises communication devices 101A-101B, a network 110, and a communication system 120.

The communication devices 101A-101B may be any device that can communicate on the network 110, such as a Personal Computer (PC), a telephone, a video system, a cellular telephone, a Personal Digital Assistant (PDA), a tablet device, a notebook device, a video device, a file server, a video server, an audio conference bridge, a video conferencing server, and the like. FIG. 1 only shows two communication devices 101A-101B, however, any number of communication devices 101 may be connected to the network 110. In addition, any of all of the communication devices 101A-101B may be directly connected to the to the communication system 120.

The communication devices 101A-101B further comprise a call processor 102 and a network interface 103. The call processor 102 can be any hardware/software that can handle a call, such as a microprocessor, a digital signaling processor (DSP), a micro-controller, a video processor, and/or the like. The network interface 103 can be any hardware/software that can communicate with network 110, such a network interface card, a wireless interface, a video card, a optical interface, a cellular interface, and/or the like.

The network 110 can be any network that can send and receive information, such as the Internet, a Wide Area Network (WAN), a Local Area Network (LAN), the Public Switched Telephone Network (PSTN), a packet switched network, an 802.11 network, a circuit switched network, a cellular network, a video network, a combination of these, and the like. The network 110 can use a variety of protocols, such as Ethernet, Internet Protocol (IP), Session Initiation Protocol (SIP), Integrated Services Digital Network (ISDN), H.323, video protocols, text protocols, and/or the like.

The communication system 120 can be any hardware/software that can handle communications, such as a Private Branch Exchange (PBX), a central office switch, a cellular switch, a trunk gateway, a session boarder controller, a proxy server, a router, a video bridge, an audio bridge, a mixer, and/or the like. The communication system 120 further comprises a communication manager 121 and a network interface 122. The communication manager 121 can be any hardware/software that can handle communications such as those described for the communication system 120. The network interface 122 can be any hardware/software, such as those described for network interface 103. Although shown as part of network 110, the communication system 120, the communication manager 121, and the network interface 122 may be distributed across multiple devices in the network 110 and/or in communication devices 101A-101B.

In this example, communication device 101A resides in Colorado and uses a Colorado telephone number and communication device 101B resides in New Jersey and uses a New Jersey telephone number. However, the locations are just for illustrative purposes and can vary based on implementation. Although this illustrative example uses telephone numbers, any type of addresses can be used, such as Session Initiation Protocol addresses, Internet Protocol (IP) addresses, Instant Messaging (IM) numbers, a video phone number, and/or the like.

The communication device 101A sends a call request 130 to communication device 101B. The call request can be for any type of call, such as a voice call, a video call, a text call, a text chat, an Instant Messaging session, a voice conference call, a video conference call, and/or the like. The call request 130 comprises a source address associated with the communication device 101A (303-538-1000) and a destination address associated with the communication device 101B

(908-444-1000). The call request 130 is received by the network interface 122. The communication manager 121 determines if the capability to modify requests is enabled. The capability to modify requests can be permanently enabled, enabled based on a user or system configuration, and/or the like. For example, the system may determine, based on the call request, that the call request 130 is for a long distance call. The communication manager 121 can determine that the call request 130 is for a long distance call in various ways, such as based on a different area code, based on a incurring a toll, based on a defined list, based on a comparison of the source and destination address, based on sending the call request 130 to the Public Switched Telephone Network (PSTN), and/or the like. In another embodiment, the system can be configured to modify requests based on a user configuration where the user wants to obfuscate a source address.

The communication manager 121 modifies the call request 130 by replacing 131A or augmenting 131B-131C the source address with a dynamic address and by adding a key (12345) associated with the source address (303-538-1000). The key may be any number/value, such as an alpha-numeric number/string, a character in one or more languages, any unique identifier, and/or the like. The dynamic address can be any address that is considered local to the destination address. The key is associated with the dynamic address. The key may be unique or may be unique in combination with the dynamic address.

In this example, the dynamic address (908-444-1222) has the same area code (908) as the destination address (908-444-1000). However, this is not a requirement. For example, in Colorado, both area codes of 720 and 303 are considered local area codes in Colorado. In this instance, a dynamic address with an area code of 303 can be used with a destination address with an area code of 720. Alternatively, if another type of address, such as an IP address were used, the address may have the same sub-net address/mask. This allows calls to be made to/from a local number, thus not incurring any long distance toll charges. The address can be any type of addresses, including MAC addresses, sockets, network addresses, and/or the like. The dynamic address comes typically from one or more addresses (e.g., telephone numbers) that a company/person owns.

The call request 130 can be modified, for example, by replacing a Session Initiation Protocol (SIP) "From" header (the source address 303-538-1000) with the dynamic address (908-444-1222) and by adding the key (12345) to the call request 130 as shown in the call request 131A. Alternatively, the call request 130 may be modified by augmenting an existing SIP "From" header (the source address 303-538-1000) by adding an additional SIP header/field to the call request 130 that contains the dynamic address (908-444-1222) and adding the key (12345) to the call request 130 as shown in the call request 131B. In another embodiment, the call request 130 may be augmented by emptying/clearing the SIP "From" header and adding the additional SIP header/field to the call request 130 that contains the dynamic address (908-444-1222) and adding the key (12345) to the call request 130 as shown in the call request 131C. The additional header/field can be any type of header or field, including being part of a packet payload. The key, or the tuple of key with the dynamic address in this example, are unique to the system.

The network interface 122 sends the modified call request 131 to the communication device 101B. The communication device 101B receives the modified call request 131 via network interface 103B. The call processor 102B responds to the call request by sending a response (e.g., a SIP 100 trying/200 Okay messages) using the location number (908-444-1222) as the destination address and the key (12345). For the call request 131A, the call processor 102B gets the dynamic address from the source address and the key, from the call request 131A. For call requests 131B and 131C, the call processor 102B gets the dynamic address from the additional field and the key from a header/field of the call request 131B or 131C.

When call requests are received from the communication device 101B, the communication manager 121 changes the destination address (908-444-1222) in the response message(s) to the source address (303-538-1000) based on the key associated with the source address. A call can then be setup between the communication device 101A and the communication device 101B.

In one embodiment, the user of the communication device 101A may be notified of the dynamic address and key that are assigned to the call request. For example the user of communication device 101A may be notified via a display on communication device 101A.

The above processes are typically implemented using Session Initiation Protocol (SIP), however, the above processes may be implemented using any protocol, such as H.323, Integrated Digital Services Network (ISDN), video protocols, text protocols, Instant Messaging protocols, and/or the like. The above process can be implemented not only for voice calls, but for video and text calls as well.

To further illustrate, consider the following example. A user of communication device 101A (telephone number 303-538-1000) wants to call a user of communication 101B in New Jersey at telephone 908-444-1000. The user of communication device 101A makes the call. A call request 130 is sent by communication device 101A with a source address (303-538-1000 as shown in call request 130) and a destination address (908-444-1000 as shown in call request 130). The call request 130 is received by the network interface 122. The communication manager 121 determines that the call request is for a long distance call because of the differing area codes of the source and destination addresses in the call request 130.

In response to determining that the call request 130 is for a long distance call, the communication manager 121 augments the call request 130 by placing the dynamic address (908-444-122) of the call request 130 in an additional field/header and by adding the key (12345) associated with the source address (303-538-1000) to the call request 130. The modified call request 131B is sent by network interface 122 to communication device 101B in New Jersey. The communication device 101B can now respond to the call request using the dynamic address (as the destination address) and the key so the call can be setup.

Figure 2:
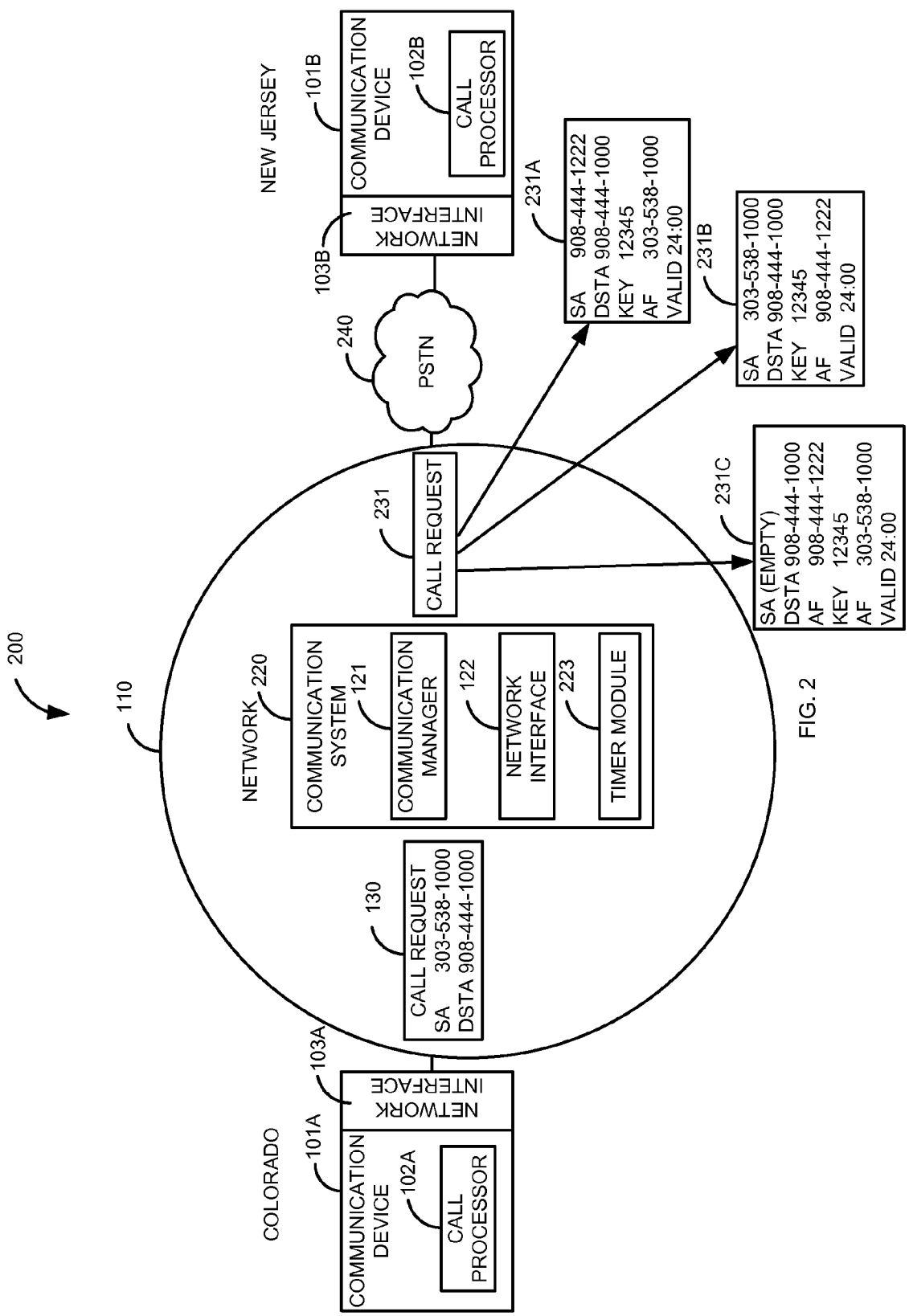
FIG. 2 is a block diagram of a second illustrative system for routing call requests.

FIG. 2 is a block diagram of a second illustrative system 200 for routing call requests (130/231). The second illustrative system 200 comprises communication devices 101A-101B, the network 110, a communication system 220, and the Public Switched Telephone Network (PSTN) 240. The communication system 220 comprises communication manager 121, network interface 122, and a timer module 223. The communication system 220 can be any type of communication system, such as communication system 120. The timer module 223 can be any hardware/software that can determine time, such as a clock, an oscillator, a clock circuit, a clock determined from the network 110, and the like.

The communication device 101A sends a call request 130 to communication device 101B. The call request comprises a source address associated with communication device 101A (303-538-1000) and a destination address associated with communication device 101B (908-444-1000). The call request 130 is received by the network interface 122. The communication manager 121 modifies the call request 130 by replacing 231A or augmenting 231B-231C the source address (303-538-1000) with a dynamic address (908-4440-122) and by adding a key (12345) associated with the source address (303-538-1000).

In addition, the communication manager 121, in this example (call request 231A) where the source address was replaced, further modifies the call request 130 by adding a validity field that indicates a time period that dynamic address (904-444-1222) is valid (in this example the validity field time period is for 24:00 hours). The validity field can be in any header or field, including the payload of a packet. In addition, the communication manager 121 may add the source address (303-538-1000) in an additional field in the call request 130 to produce call the call request 231A. Adding the validity field and/or the source address in an additional field are both optional parameters in the call request 231A. For example, only the source address field may be sent omitting the validity field. Alternatively only the validity field may be sent in any of the call requests 231A-231B (e.g., where the service provider allows anonymous requests). Which fields are sent may be based on user preference or based on an administrative configuration.

In another embodiment (call request 231B), where the source address was augmented by adding an additional field that contains the dynamic address (908-444-122), the communication manager 121 may also add the validity field to produce the call request 231B. The validity field is an optional field that may or may not be sent.

In a different embodiment (call request 231C), where the source address is augmented by emptying the source address and adding the dynamic address (908-444-1222) in an additional field, the validity field may be added along with the source address in an additional field to product the call request 231C. The validity field and the added source address in the call request 231C are both optional parameters.

If the call request 231A-231B contains the validity field, the timer modules 223 starts a timer that runs until the validity period times out. Alternatively the timer module 223 can determine an initial time. Once the validity period runs out (or the initial time is compared to the current time using the validity period), the communication manger 121 no longer accepts call requests to the dynamic address (908-444-1222) from communication device 101B (or from devices using the specific key). If the validity period has not timed out, the specific call request (based on implementation) 231A, 231B, or 231C is sent to the PSTN 240. The PSTN 240 sends the call request 231 to the communication device 101B.

The communication device 101B receives the modified call request 231, from PSTN 240, via network interface 103B. The call processor 102B responds to the call request by sending a response (e.g., a SIP 100 trying/200 Okay messages) using the dynamic address (908-444-1222) as the destination address and the key (12345). For call request 231A, the call processor 102B gets the dynamic address from the source address and the key, from the call request 131A. For call request 231B and 231C, the call processor 102B gets the dynamic address from the additional field and the key, from call request 231B or 231C. The call processor 102B stores the dynamic address (908-444-1222) and the key in case the user wants return a call to the user of communication device 101A (i.e., the user did not answer the initial call and/or caller ID).

In the above examples, only a single key and dynamic address are described. However, in other embodiments, the system may use multiple keys and/or multiple dynamic addresses. For example, where there are multiple communication devices at a location, such as in New Jersey (e.g., a communication device 101C (not shown) that is also located in New Jersey), the system can assign a different key (e.g., 12346) when a long distance call request is received for communication device 101C from communication device 101A. In this example, the second key is also associated with same source address (303-538-1000) because the call request 130 is from communication device 101A.

In another embodiment, the key may be changed based on the location of the communication device 101. For example, if the communication device 101C is in India, a different key is used along with a different dynamic address. Alternatively, the dynamic address may be permanently associated with the key. For example, when the user of the communication device 101A calls any long distance number in any location, the same key is always used and a different location number (based on the called location) is used. In another embodiment, the key may be temporarily assigned to a source address. For example, the key may only be assigned to the source address for as long as the validity time has not expired. When the validity field has expired, the key may be associated with another source address.

All the above examples in FIGS. 1 and 2 may be used on a per call basis. For example, the user/administrator may define the use of call request 231A based on a long distance call occurring. Alternatively, the user/administrator may define the use of call request 131A based on the user wanting of obfuscate their source address. An administrator may want to use this process to multiplex telephones numbers (addresses). Alternatively, the system may be enabled to allow return calls to call a common number. For example, multiple users may make calls to a common number using different keys. If a communication device that returns the call does not support handling modified requests (i.e., the response is sent without a key), the call can be routed to an attendant.

Figure 3:
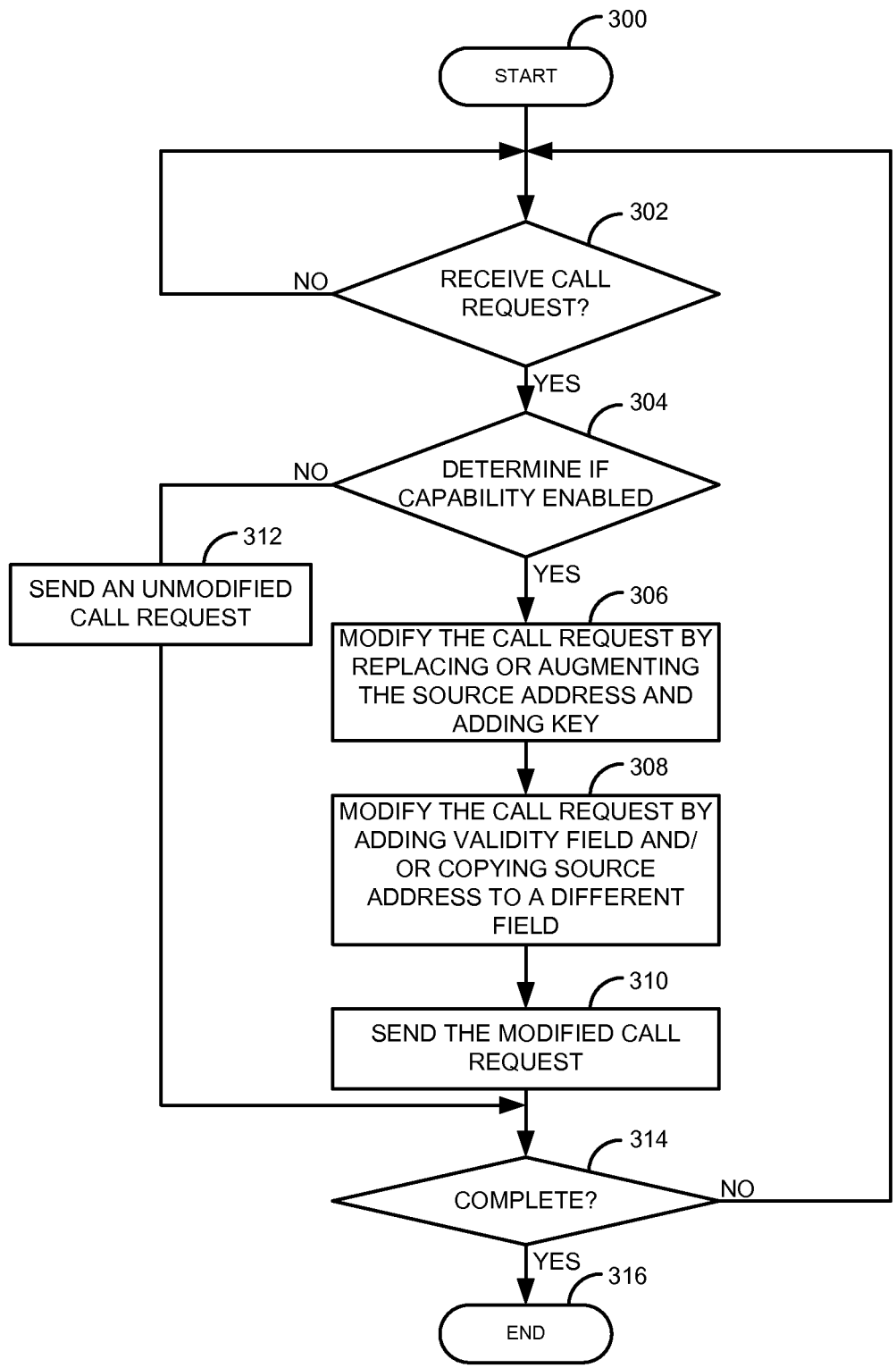
FIG. 3 is a flow diagram of a method for routing call requests.
Figure 4:
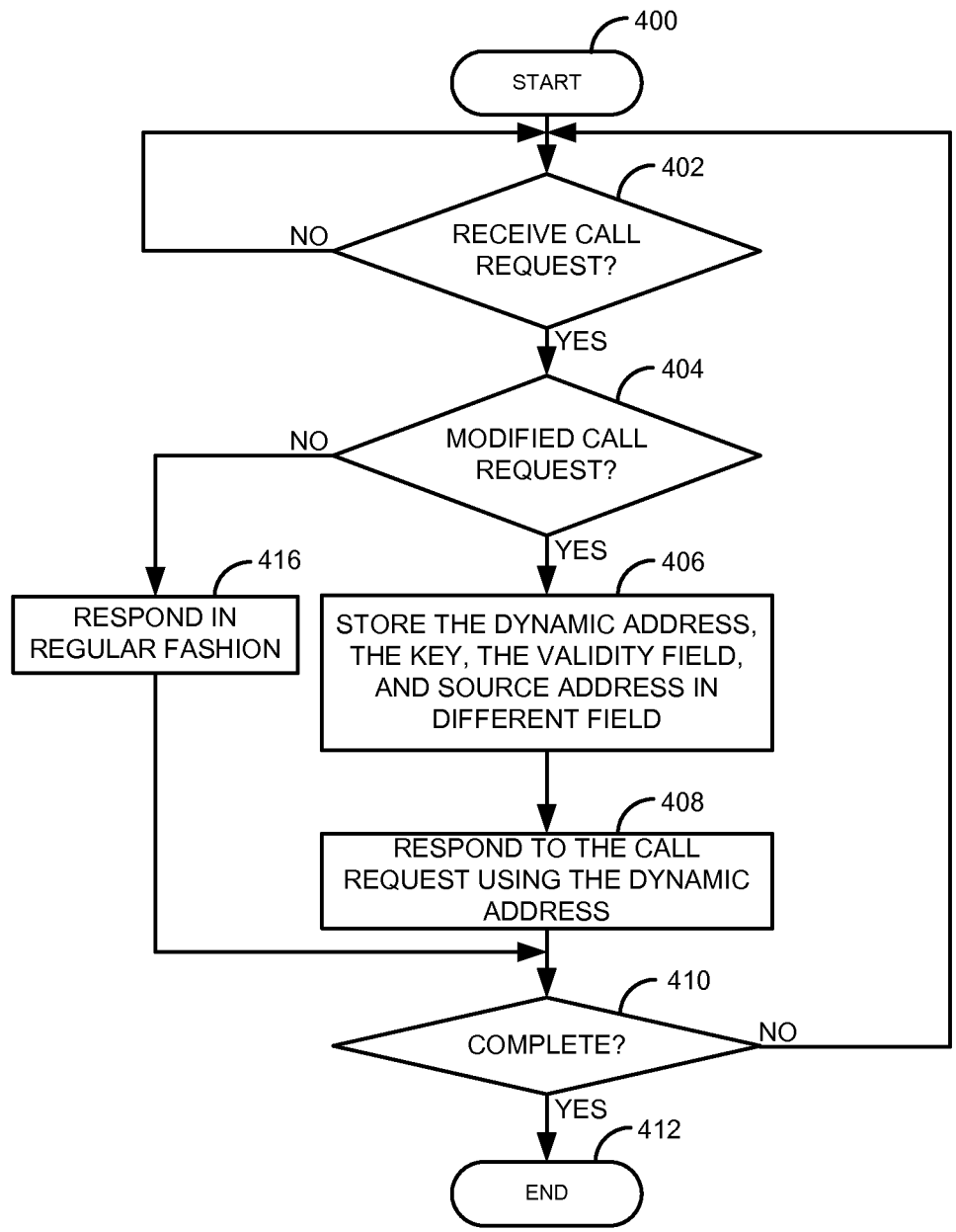
FIG. 4 is a flow diagram of a method handling an incoming call request with a modified source address.
Figure 5:
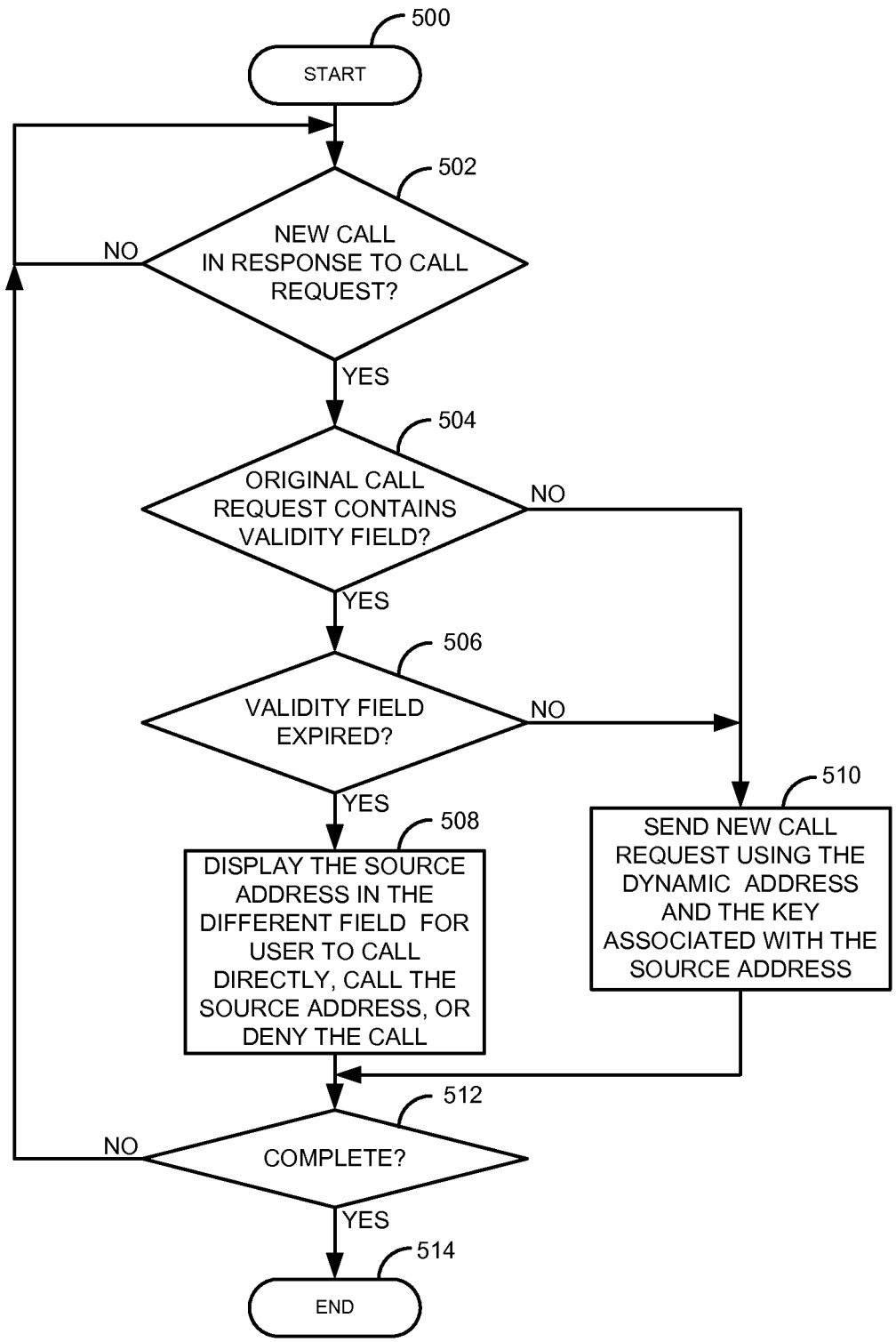
FIG. 5 is a flow diagram of a method for responding to a received call with a modified source address.

FIG. 3 is a flow diagram of a method for routing a call request. Illustratively, the communication devices 101A-101B, the call processors 102A-102B, the network interfaces 103A-103B, the communication systems 120/220, the communication manager 121, the network interface 122, and the timer module 223 are stored-program-controlled entities, such as a computer or processor, which performs the method of FIGS. 3-6 and the processes described herein by executing program instructions stored in a tangible computer readable storage medium, such as a memory or disk. Although the methods described in FIGS. 3-5 are shown in a specific order, one of skill in the art would recognize that the steps in FIGS. 3-5 may be implemented in different orders and/or be implemented in a multi-threaded environment. Moreover, various steps may be omitted or added based on implementation.

The process in FIG. 3 is from the perspective of the communication system. The process starts in step 300. The process waits for a receipt of a call request from a first communication device to a second communication device in step 302. If the call request is not received in step 302, the process repeats step 302. If a call request is received in step 302, the process determines in step 304 if the modification capability is enabled. If the modification capability is not enabled in step 304, the process sends 312 an unmodified call request to the second communication device and goes to step 314.

Otherwise, if the process determines in step 304 that the modification capability is enabled, the process modifies 306 the call request by replacing or augmenting the source address with a dynamic address and adding the key. The process optionally modifies 308 the call request by adding a validity field and/or by copying the source address into a different field (based on implementation). The process sends 310 the modified call request to the second communication device. The process determines in step 314 if the process is complete. If the process is not complete in step 314, the process goes to step 302. Otherwise, if the process is complete in step 314, the process ends in step 316.

In one embodiment, the process stores the source address, the key, and the dynamic address in a database. The database can then be accessed by different gateways/routers/communication systems that use the information to route the call requests.

FIG. 4 is a flow diagram of a method handling an incoming call request with a modified source address. The process in FIG. 4 is from the perspective of the communication device (the second communication device described in FIG. 3). The communication device waits in step 402 for an incoming call request. If a call request has not been received, the process repeats step 402. Otherwise, when a call request is received in step 402, the process determines in step 404 if the call request has been modified (e.g., from step 306 in FIG. 3). If the call request has not been modified in step 404, the process responds 416 in regular fashion (i.e., as the process would normally respond). The process goes to step 410.

If the call request has been modified in step 404, the process stores 406 the dynamic address, the key, the validity field (if there is one), and the source address (if there is one). For example, if the call request is like call request 131A/231A (where the source address was replaced with the dynamic address), the process stores the dynamic address (from the source address), the key, the source address (if there is one), and the validity field (if there is one). If the call request is like call request 131B/231B, the process stores the dynamic address (from the additional field), the key, the source address (if there is one), and the validity field (if there is one). If the call request is like call request 131C/231C, the process stores the dynamic address (from the additional field), the key, the source address (if there is one), and the validity field (if there is one). The dynamic address and the key are used to respond to the call request and to initiate new call requests based on the received call request.

The process responds 408 to the call request by using the dynamic address as the destination address and the key. The process determines in step 410 if the process is complete. If the process is not complete in step 410, the process goes to step 402. Otherwise, if the process is complete in step 410, the process ends in step 412.

In an embodiment, if the call request includes the validity field, the process can store the information in a call log. When the validity field is used, a countdown timer may be displayed to the user that indicates when the validity field expires.

FIG. 5 is a flow diagram of a method for responding to a received call with a modified source address. The process in FIG. 5 is from the perspective of the communication device (communication device 2 described in FIG. 3). The process starts in step 500. The process determines in step 502 if the user wants to make a new call in response to the original call request (received in step 402 of FIG. 4). For example, if the call was a missed call or went to voice/video mail. If the user does not want to make a new call in response to the original call request in step 502, the process repeats step 502.

In another embodiment, the user may want to make a new call request that is not based on the previous call request. For example, if at a later point, the user wants to call the person who made the original call request (i.e., from the user's address book), the user may be provided the option to make a call using the stored information from step 406. The option provided to the user of responding using the stored information (versus responding using the normal process) can be based on a response to the original call request as well.

Otherwise, if the user wants to make a new call in response to the original call request in step 502, the process determines in step 504 if the original call request contains the validity field. If the original call request does not contain the validity field in step 504, the process sends 510 a new call request using the dynamic address as the destination address and the key associated with the source address of the original call request. The process goes to step 512.

If the original call request contains the validity field in step 504, the process determines in step 506 if a time period of the validity field has expired. For example, if the time period in the validity field is 24 hours, the process determines if the original call request was received within the last 24 hours. If the time period of the validity field has not expired in step 506, the process goes to step 510. Expiration of the key may be based on other parameters, such as, based on how long a user is logged in, if the user is logged in, and/or the like. If the key expires, the key may be reused (e.g., by another user) or may be reserved for later user by the same user. If the key is reserved, even if the user changes location, the user can still use the same key. The validity field may also include a grace period, be a fixed time, or an infinite time. In an embodiment the key can be associated with the user's source address for billing purposes.

Otherwise, if the time period of the validity field has expired in step 506, the process may display 508 the source address of the communication device that sent the original call request; this allows the user to call the communication device directly. If the source address of the communication device that sent the original call is displayed, the user can then directly call user (likely incurring a long distance toll charge). Alternatively, the process may deny the call. In another embodiment, the process can call the source address directly using the source address as the destination address. The process determines in step 512 if the process is complete. If the process is not complete in step 512, the process goes to step 502. Otherwise, the process ends in step 514.

Figure 6:
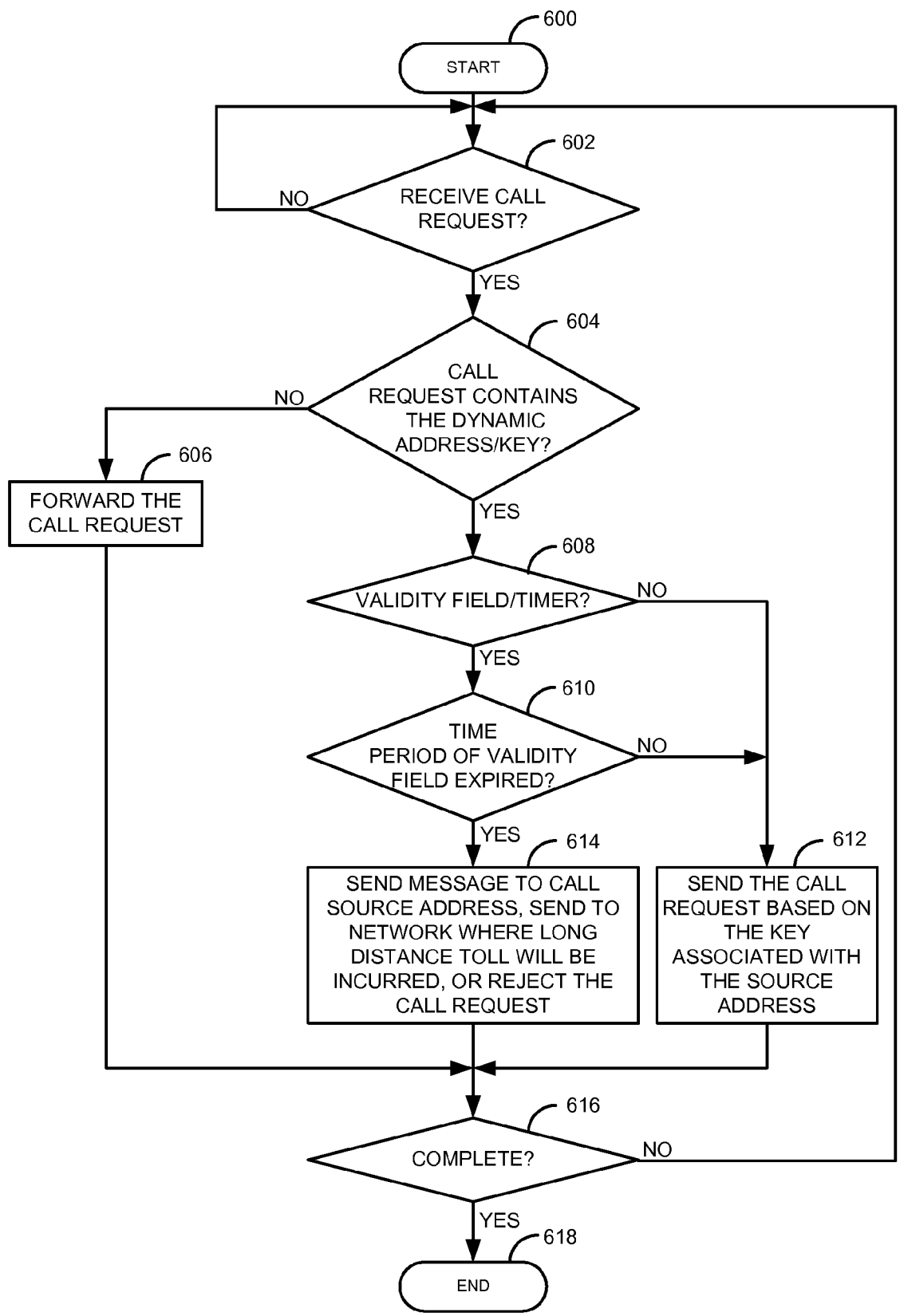
FIG. 6 is a flow diagram of a method for receiving a response call with a modified source address.

FIG. 6 is a flow diagram of a method for receiving a response call with a modified source address. The process in FIG. 6 is from the perspective of the communication system. The process starts in step 600. The process determines in step 602 if a call request has been received. If the call request has not been received in step 602, the process repeats step 602. Otherwise, if a call request has been received in step 602 (e.g., the call request sent by the communication device in step 510 of FIG. 5), the process determines in step 604 if the call request contains the dynamic address (in the destination address) and the key associated with the source address. If the call request does not contain the dynamic address and the key associated with the source address in step 604, the process forwards 606 the call request using the destination address in the call request.

Otherwise, if the call request contains the dynamic address and the key associated with the source address in step 604, the process determines if a validity field/timer is associated with the call request (e.g., the validity request added in step 308 or a timer was started without sending the validity field) in step 608. If a validity field/timer is not associated with the call request in step 608, the process goes to step 612. Otherwise, if the call request is associated with the validity field/timer in step 608, the process determines in step 610 if the time period of the validity field has expired. If the time period has not expired in step 610, the process sends 612 the call request based on the key associated with the source address. This is accomplished by replacing the destination address of the incoming call request with the source address of the first communication device. The call request may be sent to the first communication device or sent to another communication device (e.g., a central office switch for routing in another network). The process goes to step 616.

Otherwise, if the validity field has expired in step 608, the process, in step 614, can optionally send a message to the communication device that sent the call request to call the source address, route the call to a network where the long distance call will be incurred, rejects the call request, and the like. The process determines in step 616 if the process is complete. If the process is not complete in step 616, the process goes to step 602. Otherwise, the process ends in step 618.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   receiving, by a processor, a first call request, from a first communication device to a second communication device, wherein the first call request comprises a source address associated with the first communication device and a destination address associated with the second communication device;
   in response to receiving the first call request, selecting, by the processor, a dynamic address that is considered local to the destination address;
   modifying, by the processor, the first call request by replacing or augmenting the source address with the dynamic address and adding a key associated with the source address; and
   sending, by the processor, the modified call request to the second device.

2. The method of claim 1, wherein the modifying step further comprises adding a validity field to the modified call request, wherein the validity field indicates a time period for which the dynamic address is valid.

3. The method of claim 2, further comprising the steps of:
   receiving a second call request from the second communication device, wherein the second call request comprises the dynamic address and the key associated with the source address;
   determining if the time period has expired;
   in response to determining that the time period has not expired, sending the second call request to the first communication device or another communication device based on the key associated with the source address; and
   in response to determining that the time period has expired, doing at least one of the following:
   sending a message to the second communication device telling a user of the second communication device to call the source address directly;
   rejecting the second call request from the second communication device; and
   sending the second call request to another network.

4. The method of claim 2, wherein the call request is modified by replacing the source address with the dynamic address and the modifying step further comprises copying the source address to a different field in the modified call request.

5. The method of claim 1, further comprising the steps of:
   receiving a second call request from the second communication device, wherein the second call request comprises the dynamic address and the key associated with the source address and wherein the dynamic address is a destination address in the second call request; and
   sending the second call request to the first communication device based on the key associated with the source address.

6. The method of claim 1, wherein the call request is modified by augmenting the source address with the dynamic address, wherein source address is augmented by placing the dynamic address in a different field in the call request.

7. The method of claim 6, wherein the call request is further modified by emptying the source address in the call request.

8. The method of claim 1, wherein the call request is modified by replacing the source address with the dynamic address.

9. The method of claim 1, wherein the dynamic address has multiple associated keys and wherein the multiple associated keys are associated with multiple addresses of multiple communication devices.

10. The method of claim 1, wherein the key associated with the source address is different based on a location of the second communication device or the dynamic address is permanently associated with the key associated with the source address.

11. The method of claim 1, wherein the key associated with the source address is at least one of: permanently associated with the source address or temporarily associated with the source address.

12. A communication system comprising:
   a network interface programmed to receive a first call request, wherein the first call request is from a first communication device to a second communication device, and send a modified call request to the second device, wherein the first call request comprises a source address associated with the first communication device and a destination address associated with the second communication device; and
   a communication manager programmed to select a dynamic address that is considered local to the destination address in response to receiving the first call request, modify the first call request by replacing or augmenting the source address with the dynamic address, and add a key associated with the source address.

13. The communication system of claim 12, wherein the communication manager is further configured to add a validity field to the modified call request, wherein the validity field indicates a time period for which the dynamic address is valid.

14. The communication system of claim 12, wherein the network interface is further configured to receive a second call request from the second communication device and send the second call request to the first communication device or another communication device based on the key associated with the source address, wherein the second call request comprises the dynamic address and the key associated with the source address and wherein the dynamic address is a destination address in the second call request.

15. The system of claim 12, wherein the call request is modified by augmenting the source address with the dynamic address, wherein source address is augmented by placing the dynamic address in a different field in the call request.

16. The system of claim 12, wherein the call request is modified by replacing the source address with the dynamic address.

17. The communication system of claim 12, wherein the key associated with the source address is different based on a location of the second communication device or the dynamic address is permanently associated with the key associated with the source address.

18. A first communication device comprising:
a network interface programmed to receive a modified call request, wherein the modified call request comprises a destination address of the first communication device, a dynamic address that replaced or augmented a source address of a second communication device, and a key associated with the source address of the second communication device, wherein the dynamic address is selected based on the destination address of the first communication device and wherein the dynamic address is considered local to the destination address; and
a call processor configured to respond to the modified call request.

19. The first communication device of claim 18, wherein the modified call request further comprises a validity field that indicates a time period for which the dynamic address is valid and the source address that was copied into a different field in the modified call request.

20. The first communication device of claim 19, wherein call processor is further configured to do at least one of the following:
determine if the time period has expired when receiving a request from a user to call the dynamic address and in response to the time period not expiring, send a second call request using the dynamic address and the key associated with the source address of the second communication device; and
determine if the time period has expired when receiving the request from the user to call the dynamic address and in response to the time period expiring, display the source address of the second communication device to the user, deny the request from the user to call the dynamic address, or route the call request to another network using the source address.

* * * * *